Jan. 31, 1939. C. A. SCOGLAND ET AL 2,145,612
REEL SEAT
Filed Sept. 13, 1937
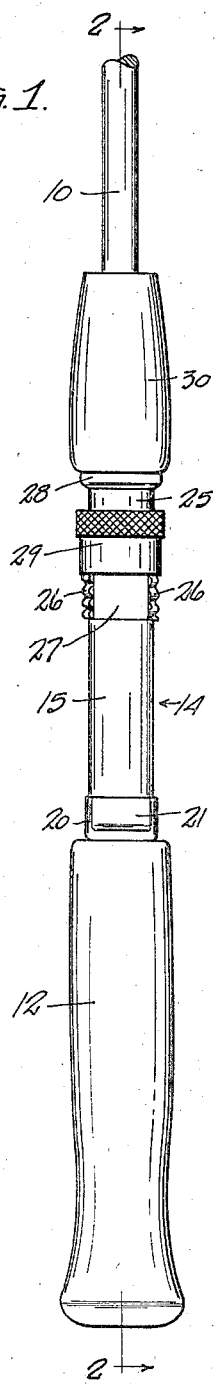
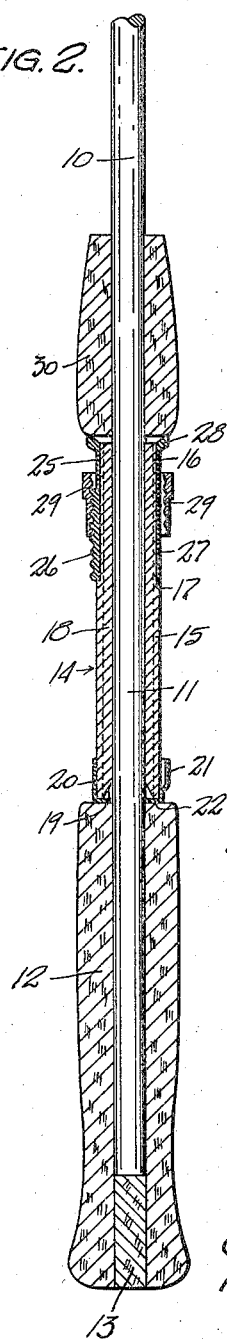
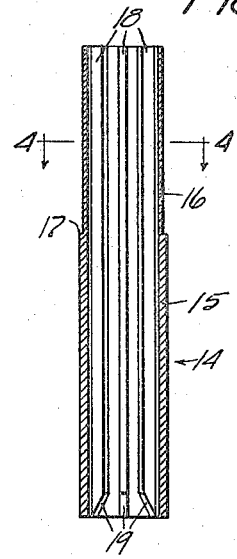
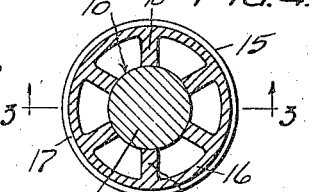
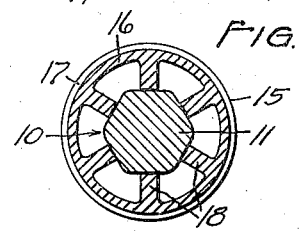
CHARLES A. SCOGLAND.
PHILIP H. SANDERS.
INVENTORS.
BY Oltsch & Knoblock
ATTORNEYS.

Patented Jan. 31, 1939

2,145,612

UNITED STATES PATENT OFFICE 2,145,612

REEL SEAT

Charles A. Scogland and Philip H. Sanders, South Bend, Ind., assignors to South Bend Bait Company, South Bend, Ind., a corporation of Indiana Application September 13, 1937, Serial No. 163,586

10 Claims. (Cl. 43—22)

This invention relates to reel seats, and particularly to a construction by means of which a fishing reel may be mounted on a fishing rod.

Heretofore such reel seats have generally been made entirely of metal. This has generally required construction of the fishing rod with an enlarged butt end, or a rod handle portion extended within the reel seat to accommodate a reel seat barrel of proper diameter relative to the comparatively small rod diameter. Such constructions have proven satisfactory, but require considerable labor to manufacture and assemble and are comparatively expensive. Previous reel seat constructions have also required the barrels thereof to be formed of comparatively heavy stock to permit formation of threads thereon for mounting reel plate locking means, or the soldering thereto of threaded sleeves, sockets and the like, all involving substantial labor and expense and some positive mechanical securing means to interconnect the parts.

It is, therefore, the primary object of this invention to provide a reel seat having part thereof formed of molded plastic material constructed and arranged to accommodate simple and rapid manufacture and assembly.

A further object is to provide a reel seat having an internally ribbed hollow barrel adapted to fit on a rod of comparatively small thickness and to firmly mount a threaded sleeve at one end thereof.

A further object is to provide a reel seat having a hollow barrel provided with equi-spaced longitudinally extending radial internal ribs adapted to solidly fit on rods of various cross-sectional configurations.

A further object is to provide a reel seat constructed and arranged whereby the parts thereof fit together on a fishing rod securely and operatively by friction and without the use of securing means.

A further object is to provide a reel seat construction formed of a plurality of parts which fit together on a fishing rod to be held in place by hand grips on said rod.

Other objects will be apparent from the description and the appended claims.

In the drawing:

Fig. 1 is a fragmentary side elevation of a fishing rod.

Fig. 2 is a longitudinal sectional view taken on line 2—2 of Fig. 1.

Fig. 3 is an enlarged longitudinal sectional view of the tubular body of the reel seat taken on line 3—3 of Fig. 4.

Fig. 4 is a transverse sectional view taken on line 4—4 of Fig. 3 illustrating the application of the tubular body of the reel seat mounted on a fishing rod of circular cross-section.

Fig. 5 is a transverse sectional view similar to Fig. 4 and illustrating application of the reel seat tubular body on a fishing rod of hexagonal cross-section.

Referring to the drawing, which illustrates the preferred embodiment of the invention, the numeral 10 designates a fishing rod, such as a tapered elongated bamboo shaft of circular or hexagonal cross-section. The exposed portion of this rod is smooth finished and smooth coated as with varnish; and the concealed or butt portion 11 thereof is preferably of equal transverse dimension throughout its length and either unfinished or roughened for purposes to be hereinafter set forth. On the extreme end of butt portion 11 of the rod is mounted a hand grip 12 preferably formed of cork. Handle 12 is suitably configured and has a central bore therethrough in which butt portion 11 of rod 10 fits snugly, the roughened surface of said rod portion 11 serving to afford a firm frictional fit between rod and handle, though it may be cemented or glued on the rod if desired. The rod 10 preferably terminates forwardly of the rear end of the handle, and a cork plug 13 is fitted in the handle bore to fill the same.

A tubular barrel or sleeve 14 fits on rod 10 forwardly of hand grip 12. Sleeve 14 is preferably formed of molded plastic material, such as "Tenite", and comprises a large diameter portion 15 and a reduced diameter portion 16, there being a flat circumferential transverse shoulder 17 between said portions. Sleeve 14 is of substantially greater diameter than rod portion 11 on which it fits, as is also the longitudinal bore therethrough, thereby providing the walls of the sleeve of thin section to accommodate rapid molding thereof. A plurality of radial ribs 18 extend longitudinally from end to end of sleeve 14 in equi-spaced relation to the interior of the sleeve, and are integrally formed therewith. Ribs 18 are preferably six in number, with the opposed inner edges thereof spaced apart a distance equal to the diameter of a circular rod or substantially equal to the spacing of opposed faces of a rod of hexagonal or other polygonal section, whereby sleeve 14 fits firmly on rod portion 11. Ribs 18 are beveled at 19 at one end to facilitate application thereof on said rod.

A socket 20, preferably formed of sheet metal, fits between handle 12 and sleeve 14. This socket comprises a cylindrical body portion fitting snugly around the end of large diameter portion 15 of sleeve 14 at one end thereof for the major portion of its circumference and having an integral outward offset portion 21 spaced from said sleeve. An apertured in-turned flange 22 is formed at one end of socket 20 to fit between the ends of hand grip 12 and sleeve 14 and to loosely encircle the rod 10.

A sleeve 25, such as a die casting, fits snugly on the reduced portion 16 of sleeve 14, and is preferably somewhat longer than said portion 16. A series of outwardly protruding screw threads 26 are formed at one end of sleeve 25, said sleeves preferably being interrupted by a longitudinally extending smooth-faced portion 27 of a width approximately one-fourth of the circumference of said sleeve and inset relative to threads 26. The thickness of the wall of sleeve 25 at slot 27 is preferably equal to the depth of shoulder 17 of barrel 14. The end of sleeve 25 opposite said threaded end is preferably outwardly flared at 28. An internally screw-threaded collar or nut 29 having an enlarged knurled end portion is threaded on sleeve 25; the threads at the lower end thereof preferably being slightly shallower than the remainder thereof for purposes to be hereinafter set forth.

A cork handle or gripping portion 30 of suitable configuration and having a central bore of the same diameter as rod portion 11, fits tightly on said rod and bears against flared end 28 of sleeve 25.

It will thus be seen that the rod, hand grips and reel seat comprise a plurality of parts which may readily be independently manufactured. To assemble these parts in operative relation collar 29 is first threaded on sleeve 25, and this unit is fitted on reduced portion 16 of sleeve 14; and socket 20 is fitted on the end of enlarged portion 15 of sleeve 14. Hand grip 30 is fitted on the rod at the upper end of portion 11 of the rod. Then the sleeve 14, with its assembled sleeve 25, collar 29 and socket 20, may be slid on rod portion 11 with the projecting flared end 28 of sleeve 28 abutting the inner or lower end of handle 30. Handle grip 12 is then fitted on the rod to press against socket 20 and plug 13 is applied.

The cork hand grips 12 and 30 effectively grip the roughened butt portion 11 of rod 10 to prevent sliding and displacement thereof on said rod. However, to insure firm positioning of these handles, they may be cemented or glued. The stationary reel seat parts, i. e. sleeves 14 and 25, and socket 20 are held in operatively assembled relation between the handles, the sleeve 25 being held against sliding on sleeve 14 by abutment with shoulder 17 at one end and engagement of flared end 28 thereof with handle 30 at its opposite end, all without the use of mechanical securing means therewith. The tight frictional fit of sleeve 25 and socket 20 on sleeve 14, coupled with the end pressure applied by the hand grips, serves to hold the reel base plate engaging and receiving portions 27 and 21 thereof, respectively, in alignment.

In use, the base plate of a fishing reel seats against barrel portion 15 and reduced smooth portion 27 of sleeve 25, which portion 27 is preferably flush with portion 15 of sleeve 14. One end of said base plate is inserted within off-set 21 of socket 20, and the collar 29 is threaded on sleeve 25 to overlie the opposite end of said base plate, with the tapered interior of said collar accommodated by the lower shallow threads thereof serving to urge said base plate solidly against sleeve portions 15 and 27. The ribs 28 serve to reinforce sleeve 14 to permit the same, though of thin walled section, to sustain the pressure applied thereagainst by the reel. Likewise, said ribs permit use of one sleeve construction as standard for all rods of the same thickness, whether said rods be of circular or polygonal cross-section, and eliminate the necessity of a thick walled sleeve, an enlarged rod butt, a handle insert, or the like to provide a surface of proper enlarged diameter relative to the rod section for the purpose of receiving and seating the base plate of a fishing reel.

We claim:—

1. In combination, a fishing rod, a thin walled sleeve encircling said rod and having a plurality of equi-spaced longitudinally extending interior ribs seating on said rod, said sleeve having a circumferential shoulder intermediate its ends, a socket encircling one end of said sleeve, an adjustable reel plate lock mounted on the other end of said sleeve and abutting said shoulder, and stationary hand grips on said rod respectively abutting said socket and lock.

2. In combination, a fishing rod, a sleeve encircling said rod and having longitudinal interior radial integral ribs bearing on said rod, a portion of said sleeve being of reduced diameter to provide a shoulder, a threaded sleeve fitting on and of a length at least equal to the length of said reduced portion, and a hand grip on said rod engaging the end of said threaded sleeve to hold the same against said shoulder.

3. In combination, a fishing rod, a sleeve concentric of and outwardly spaced from said rod, a plurality of equi-spaced interior ribs extending longitudinally of said sleeve and bearing against said rod, said sleeve being of reduced external diameter at one end, a threaded sleeve fitting snugly on the reduced portion of said first sleeve and including a longitudinal slotted portion flush with the large diameter portion of said first sleeve, and a hand grip on said rod engaging the outer end of said threaded sleeve to lock the same on said first sleeve.

4. In combination, a fishing rod, a sleeve concentric with and spaced from said rod having longitudinal interior ribs engaging said rod, said sleeve having an exterior shoulder, a reel plate lock including a threaded sleeve snugly fitting on said first sleeve, said threaded sleeve abutting said shoulder at one end and projecting beyond the end of said sleeve at its opposite end, a reel plate socket at the other end of said first sleeve, and spaced hand grips fixed on said rod and abutting said socket, and threaded sleeve to lock said parts in operative relation.

5. In a reel seat, a thin walled sleeve having a plurality of equi-spaced longitudinally extending radial interior ribs adapted to fit on a fishing rod of reduced thickness as compared to the interior diameter of said sleeve, said ribs and sleeve being integral and molded of a synthetic resin.

6. The device of claim 5, wherein said ribs extend from end to end of said sleeve and are bevelled at one end to facilitate insertion of a rod therebetween.

7. The device of claim 5, wherein said ribs are six in number to fit on a rod of any desired cross-sectional shape and of a thickness substantially equal to the spacing of the inner faces of opposite ribs.

8. The device of claim 5, wherein one end portion of said sleeve is of reduced exterior diameter to provide a circumferential shoulder intermediate the ends of the sleeve.

9. The device of claim 5, having one end of said sleeve of reduced exterior diameter, and a threaded metal sleeve snugly fitting on the reduced end portion of said first sleeve.

10. The device of claim 5, having one end of said sleeve of reduced exterior diameter, and a metal sleeve snugly fitting on the reduced end of said first sleeve and having a series of protruding screw threads interrupted by a longitudinal slot which extends substantially flush with the large diameter portion of said first sleeve.

CHARLES A. SCOGLAND.
PHILIP H. SANDERS.